US009389970B2

(12) United States Patent
Bivens et al.

(10) Patent No.: US 9,389,970 B2
(45) Date of Patent: Jul. 12, 2016

(54) SELECTED VIRTUAL MACHINE REPLICATION AND VIRTUAL MACHINE RESTART TECHNIQUES

(71) Applicant: International Business Machines Corporation, Armonk, NY (US)

(72) Inventors: John A. Bivens, Ossining, NY (US); Abhas Bodas, Framingham, MA (US); Yu Deng, Yorktown Heights, NY (US); Richard E. Harper, Chapel Hill, NC (US); Ruchi Mahindru, Elmsford, NY (US); Harigovind V. Ramasamy, Ossining, NY (US); Soumitra Sarkar, Cary, NC (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 14/069,738

(22) Filed: Nov. 1, 2013

(65) Prior Publication Data

US 2015/0127970 A1    May 7, 2015

(51) Int. Cl.
*G06F 11/00* (2006.01)
*G06F 11/20* (2006.01)
*G06F 9/455* (2006.01)
*G06F 11/14* (2006.01)

(52) U.S. Cl.
CPC ........ *G06F 11/2007* (2013.01); *G06F 9/45533* (2013.01); *G06F 9/45558* (2013.01); *G06F 11/1484* (2013.01); *G06F 2009/45562* (2013.01); *G06F 2009/45575* (2013.01)

(58) Field of Classification Search
CPC . G06F 11/1484; G06F 9/4868; G06F 9/4557; G06F 9/45575
See application file for complete search history.

(56) References Cited

U.S. PATENT DOCUMENTS 7,290,017 B1    10/2007    Wang et al.
8,527,990 B1 *    9/2013    Marathe ............... G06F 9/45558
                                                            718/1

(Continued)

OTHER PUBLICATIONS

Bose et al. CloudSpider: Combining Replication with Scheduling for Optimizing Live Migration of Virtual Machines across Wide Area Networks, 2011 11th IEEE/ACM International Symposium on Cluster, Cloud and Grid Computing (CCGrid), pp. 13-22, IEEE, 2011.

*Primary Examiner* — Yolanda L Wilson
(74) *Attorney, Agent, or Firm* — Ryan, Mason & Lewis, LLP (57) ABSTRACT

Methods, systems, and articles of manufacture for selected VM replication and VM restart techniques are provided herein. A method includes selecting a sub-set of one or more VMs from a set of multiple VMs in a system to be replicated before an identification of one or more failed VMs in the set of multiple VMs; replicating the sub-set of one or more VMs before the identification of one or more failed VMs in the set of multiple VMs; selecting a sub-set of the identified one or more failed VMs to be restarted upon an identification of the one or more failed VMs in the set of multiple VMs in the system; and restarting the sub-set of the identified one or more failed VMs upon the identification of the one or more failed virtual machines in the set of multiple VMs.

20 Claims, 5 Drawing Sheets

(56) References Cited

U.S. PATENT DOCUMENTS

| | | | |
|---|---|---|---|
| 9,047,108 B1 * | 6/2015 | Rajaa | G06F 9/4856 |
| 2010/0071025 A1 | 3/2010 | Devine et al. | |
| 2010/0257269 A1 | 10/2010 | Clark | |
| 2010/0306382 A1 * | 12/2010 | Cardosa | G06F 9/5044 |
| | | | 709/226 |
| 2012/0072393 A1 | 3/2012 | Kumar et al. | |
| 2012/0084445 A1 * | 4/2012 | Brock | G06F 9/5077 |
| | | | 709/226 |
| 2012/0284471 A1 | 11/2012 | Hur et al. | |
| 2012/0311576 A1 * | 12/2012 | Shu | G06F 9/45558 |
| | | | 718/1 |
| 2012/0324183 A1 * | 12/2012 | Chiruvolu | G06F 11/2038 |
| | | | 711/162 |
| 2013/0007506 A1 * | 1/2013 | Jain | G06F 11/1484 |
| | | | 714/4.12 |
| 2013/0036323 A1 * | 2/2013 | Goose | G06F 11/1484 |
| | | | 714/4.11 |
| 2013/0091285 A1 | 4/2013 | Devarakonda et al. | |
| 2013/0185716 A1 * | 7/2013 | Yin | G06F 9/45558 |
| | | | 718/1 |

* cited by examiner

SELECTED VIRTUAL MACHINE REPLICATION AND VIRTUAL MACHINE RESTART TECHNIQUES

FIELD OF THE INVENTION

Embodiments of the invention generally relate to information technology, and, more particularly, to virtual machine (VM) management.

BACKGROUND

Failure recovery scenarios present multiple challenges within the context of VM management. High-availability and disaster recovery of VMs and/or services can be enabled by replication and/or restart. Central processing unit (CPU), memory and storage may all be included in a replica. Full-replication of VMs in the cloud requires the CPU, memory states, and storage of all of the VMs be duplicated, which presents high overhead costs. As such, a need exists to select a particular set of VMs to replicate in failure recovery scenarios to reduce the overhead costs.

Additionally, not all failed VMs can be restarted when resources are insufficient. Also, when resources are sufficient, a restart of all failed VMs may take a long time, as computation resource will likely create a bottleneck. As such, a need exists to select a particular set of VMs to restart earlier than other VMs in a system.

SUMMARY

In one aspect of the present invention, techniques for selected VM replication and VM restarts are provided. An exemplary computer-implemented method can include steps of selecting a sub-set of one or more VMs from a set of multiple VMs in a system to be replicated before an identification of one or more failed VMs in the set of multiple VMs; replicating the sub-set of one or more VMs before the identification of one or more failed VMs in the set of multiple VMs; selecting a sub-set of the identified one or more failed VMs to be restarted upon an identification of the one or more failed VMs in the set of multiple VMs in the system; and restarting the sub-set of the identified one or more failed VMs upon the identification of the one or more failed virtual machines in the set of multiple VMs.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for selected VM replication and VM restart in enhancing availability of services with inter-dependent components. For example, at least one embodiment of the invention includes selected VM replication which can be proactive (that is, include actions taken prior to a failure). In such an embodiment, a certain number of spare resources are set aside, and a set of VMs are selected to be replicated in the spare resources to maximize service values in the event of failure(s). In at least one embodiment of the invention, these resources are set aside by the user or the system administrator before and/or while the applications or the cloud system executes. The replication factor in such an embodiment can be configurable. The percentage of resources set aside as spare resources can also be configurable, and can be based on a trade-off between resource overhead for replication and availability enhancement.

Additionally, at least one embodiment of the invention includes selected VM restarts, which can be reactive (that is, include actions taken post-failure when a failed VM has no replica). In such an embodiment, a set of failed VMs are selected to restart to maximize service values with the constraints of computation capacity (as well as network bandwidth capacity for image replication, if required).

In selected VM replication and/or selected VM restarts, a VM group can be formed and/or identified to respect dependency relationships between VMs in composite applications that contribute to the provision of a service together. In accordance with one or more embodiments of the invention, selecting VMs for replication and/or restart can be carried out within multiple contexts. For example, in one such context, each VM is equally important in the group for the service provision. Additionally, in another such context, each VM is assigned a weight within the group for the service provision. Also, at least one embodiment of the invention includes selecting failure-prone VM(s) from the groups for replication based on combined information on enterprise priorities of applications and failure behavior of individual VMs.

Figure 1:
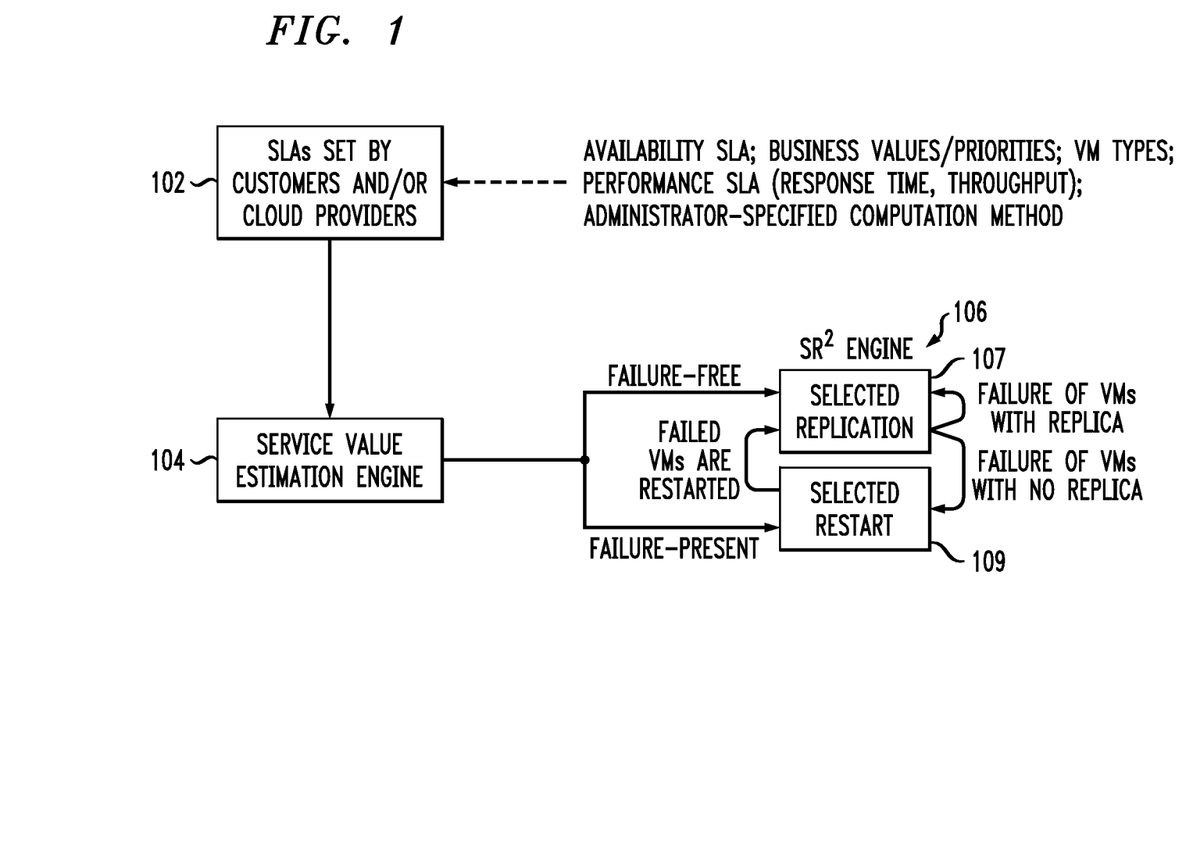
FIG. 1 is a diagram illustrating an example embodiment, according to an embodiment of the invention.

FIG. 1 is a diagram illustrating an example embodiment, according to an embodiment of the invention. By way of illustration, FIG. 1 depicts service level agreements (SLAs) 102 set by customers and/or Cloud providers, which can be based on and/or derived from factors including availability SLAs, business or enterprise values and/or priorities, VM types, performance SLAs (such as response time, throughput, etc.), administrator-specified computation methods, etc. The SLAs 102 are provided to a service value estimation engine 104, which interacts with the selected replication/restart engine ($SR^2$ engine) 106. The service value estimation engine 104 computes the service value out of factors such as listed above by following a formula specified by the user and/or system administrator.

During normal behavior, there are no failures in the system, and the service value estimation engine 104 provides input to the selected replication component 107 (of the $SR^2$ engine 106) which exploits the input to determine which VMs should be replicated in the spare resources. Then, if a failure of VMs occurs, the selected replication component 107 determines if all of the failed VMs have replicas available; if replicas are available, the replicas are made the primary VMs of the failed VMs; if any of the replicas are not available, those failed VMs with available replicas have their replicas made as the primary VMs, while those failed VMs without available replicas are restarted by the selected restart component 109 (of the $SR^2$ engine 106). This procedure is illustrated as the two arrows on the right of the selected replication component 107 and selected restart component 109 in FIG. 1.

During the selected restart component's restart of the failed VMs, the service value estimation engine's input is used for determining the priority and order of the VMs' restarts (as illustrated by the arrow from the service value estimation engine 104 to the selected restart component 109 in FIG. 1). After all of the failed VMs are restarted, there is no failure in the system and the system executes normally in the failure-free state. Then, the selected replication component 107 resumes the task of selecting which VMs to replicate (this is illustrated by the arrow from the selected restart component 109 to the selected replication component 107 in FIG. 1).

In at least one embodiment of the invention, the $SR^2$ engine 106 includes capabilities for handling dependencies between service components and/or VMs. In at least one example embodiment of the invention, for any running VM, v, there is at least one available service to which v contributes. As noted herein, customers and service providers have flexibility to define the service value, as well as to assign proper values.

As detailed herein, an objective of one or more embodiments of the invention is to achieve a maximum service value when failure behavior is considered. As described herein, the selected replication component 107 of $SR^2$ engine 106 minimizes the probability of failing high-value services. In accordance with one or more embodiments of the invention, failures occur to individual VMs rather than to all VMs of a service at a time. Additionally, VM failure is a stochastic process, and there is no need to have all VMs of a service replicated (unless mandated by the customer with the replication policies for disaster recovery (DR)).

The selected restart component 109 of $SR^2$ engine 106 maximizes the values of recovered services within the context of any relevant resource constraints.

Figure 2:
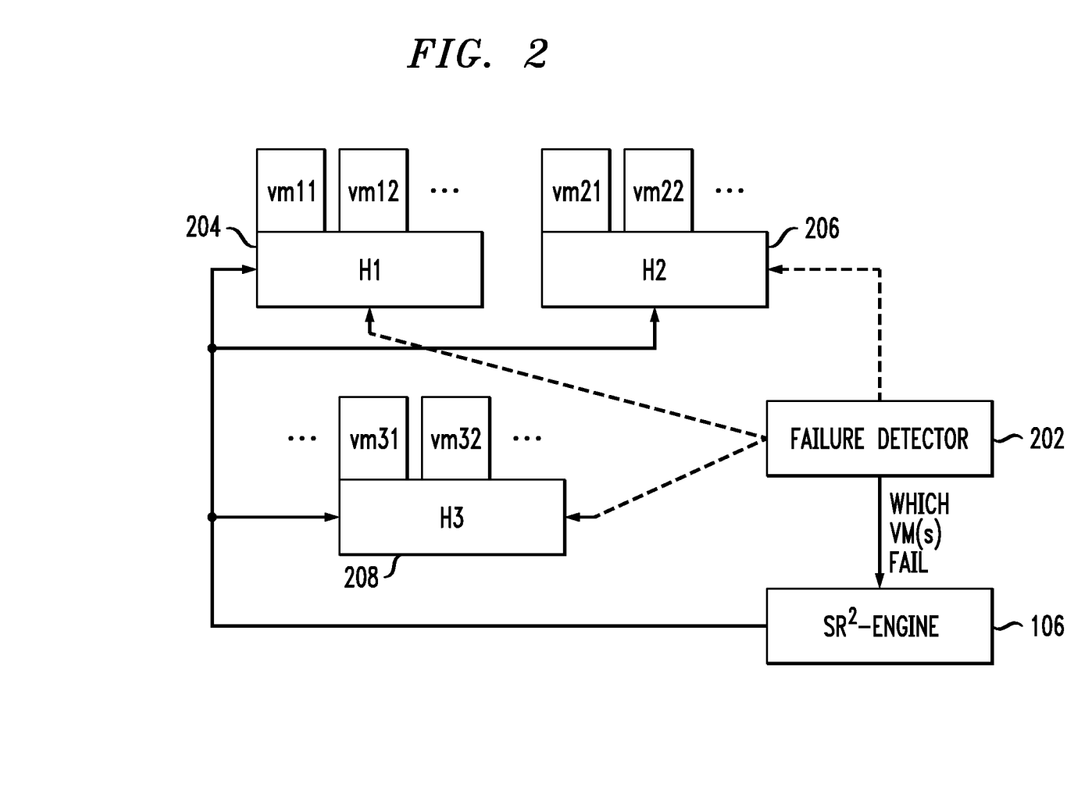
FIG. 2 is a diagram illustrating an example embodiment, according to an embodiment of the invention.

FIG. 2 is a diagram illustrating an example embodiment, according to an embodiment of the invention. By way of illustration, FIG. 2 depicts $SR^2$ engine 106, which receives input from a failure detector component 202. The failure detector component 202 interacts with hypervisors such as hypervisor 1 (H1) 204 (which includes vm11 and vm12), hypervisor 2 (H2) 206 (which includes vm21 and vm22) and hypervisor 3 (H3) 208 (which includes vm31 and vm32). The failure detector component 202 detects any failures of the VMs and notifies the $SR^2$ engine 106 of the detected failures. Additionally, based on the input provided by the failure detector component 202, the $SR^2$ engine 106 provides input and/or instructions to the relevant hypervisors (for example, hypervisors 204, 206 and 208). The $SR^2$ engine's selected replication component and selected restart component determine which VM replicas should be identified as the primary VMs and/or which VMs should be restarted, and also request the relevant hypervisors to perform primary VM identifications and VM restarts.

Figure 3:
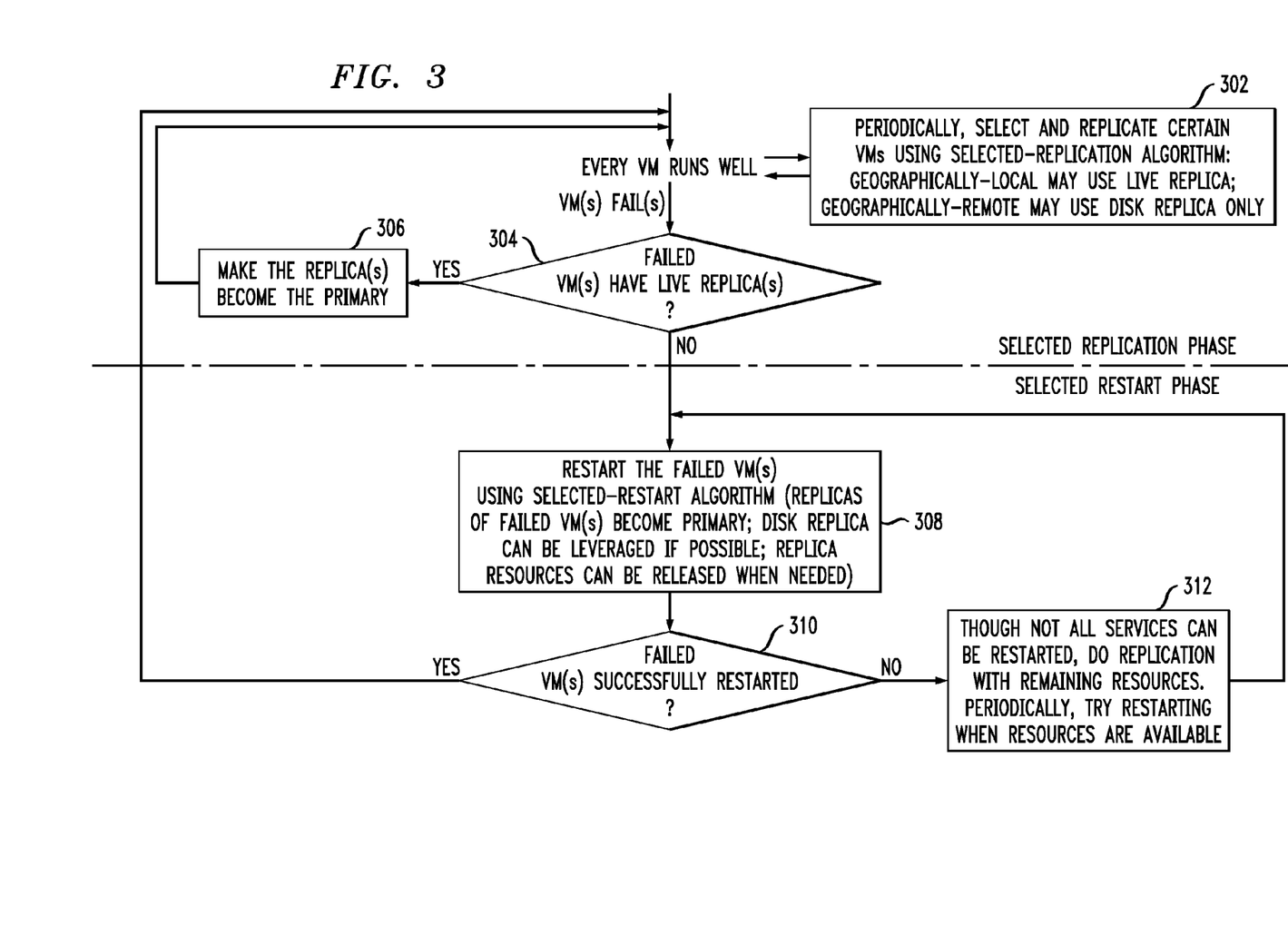
FIG. 3 is a flow diagram illustrating techniques according to an embodiment of the invention.

FIG. 3 is a flow diagram illustrating techniques according to an embodiment of the invention. Step 302 includes periodically selecting and replicating certain VMs using a selected replication algorithm. For example, the selected replication algorithm can select a set of VMs and replicate the selected set of VMs. Multiple factors can be considered in the selected replication, and such factors are values and/or inputs for the framework depicted in the FIG. 3 flow diagram.

By way of illustration, assume the existence of service path knowledge as well as which service paths are more important. In at least one embodiment of the invention, monitoring and/or tracing tools can be used for this purpose. Such knowledge may also be input from a user, which would represent a value-assign stage.

Additionally, at a starting point, assume that every VM has at least the primary copy running. If a VM fails, step 304 includes determining whether the failed VM(s) have live replica(s). If a failed VM has a live replica, then the replica is made the primary in step 306, and the sequence returns back to the beginning of the flow diagram. Also, as used herein, making the primary (as well as various analogous phrases thereof) indicate that the replica replaces the failed VM. The failed VM does not exist when the replica becomes the primary. If a failed VM has no replica, the sequence continues to the selected restart phase (and to step 308). As detailed herein, at least one embodiment of the invention includes a detector that detects VM failure and whether there is a live replica running.

Step 308 includes running a selected restart algorithm to restart the failed VM(s) and recover service paths. At least one embodiment of the invention includes maximizing the value of recovered service paths while satisfying the SLAs as much as possible. The value can include, for example, a measurement of satisfaction of SLAs. If there is no resource available for restarting failed VMs, the live replicas can be shut down to create sufficient resources for a restart.

Additionally, step 310 includes determining if the failed VM(s) have been successfully restarted. If all failed VM(s) have been restarted and all service paths have been recovered by the selected restart algorithm, the sequence returns back to the beginning of the flow diagram. If all failed VM(s) have not been successfully restarted because resources are not sufficient, a replication can still be performed with remaining resources in step 312. Further, at least one embodiment of the invention includes periodically attempting to restart the failed VM(s) when resources are available and sufficient.

At least one embodiment of the invention includes using values associated with service node sets (that is, groups of VMs providing a service together) to control VM resource assignment decisions. SNS values can be derived from business value (including customer input), and the value of a VM can be determined by the number and values of the SNSs of which the VM is a member.

Accordingly, at least one embodiment of the invention includes optimizing the total value of SNSs for all provided services wherein, for example, one VM's failure can render the values of multiple SNSs void, and wherein constraints include constraints of resource capacity of hypervisors. Also, such an embodiment of the invention includes combining replication and restart operations in an integral framework to generate combined protection of high-value SNSs and failure-prone VMs.

At least one embodiment of the invention also includes handling failures of VMs hosting inter-dependent components. Accordingly, an execution flow that processes a service request involves software components in one or multiple VMs. A VM failure causes any software component in the VM to fail, and a failure of a software component breaks any request-processing execution flow which includes this component. Additionally, values (for instance, business values and/or SLAs) are assigned to different services and/or different types of service requests. To determine how much VM failure impacts the values of different services and/or different types of service requests, at least one embodiment of the invention includes addressing the gap between service-type-level values and execution-flow-level failures.

As used herein, an execution path refers to an execution sequence of software components that process a service request. Additionally, an execution path node set refers to a set of VMs that are involved in an execution path, while a service node set, as noted above, refers to a set of VMs that are involved in any of the execution paths that process one type of service request. Further, different services and different types of service requests can have the same SNS, and a VM can be in one or multiple SNSs.

A service path set (SPS) refers to a set of all execution paths that process one type of service request. Also, an SPS value measures importance of the work provided by a SPS, wherein the value is associated with one type of service request.

There is an SPS and an SNS associated with one type of service request. When each VM in the SNS is equally important for the SPS, failure of any VM in the SNS results in zero value for the SPS, the weights of all VMs in the SNS are set as one, and all VMs in the SNS are involved in every element (execution path) of the SPS. At least one embodiment of the invention includes assigning different importance weights to the VMs in the SNS. Also, at least one embodiment of the invention includes obtaining failure rates of VMs from literature (for example, certain failure models correspond to certain workloads) and/or from experience and/or historical data. A failure and/or error model (that is, the type of failures) includes transient errors including those caused by security and/or reliability vulnerabilities.

Additionally, the following notation is used herein for purposes of describing SR² engine framework:

$VM_j$ refers to VMs, wherein j=1, 2, . . . n;
$H_i$ refers to hypervisors, wherein i=1, 2, . . . m;
$SPS_k$ refers to service path sets, wherein k=1, 2, . . . l;
$SNS_k$ refers to service node sets for $SPS_k$;
$u_k$ refers to the value of $SPS_k$;
$y_{k,j}$ refers to the weight of $VM_j$ in $SNS_k$, which is 0 if $VM_j$ is not in $SNS_k$;
$r_j$ refers to the resource being used by $VM_j$;
$R_i$ refers to the resource in $H_i$; and
$x_{i,j}$ is 1 when $VM_j$ (or its replica) is on $H_i$, and is 0 otherwise.
$X_j$ is 1 when $VM_j$ (or its replicas) is running in any hypervisor, and is 0 otherwise.

For selected replication only, $\alpha$ represents a replication factor and $\lambda_j$ represents a failure rate of $VM_j$.

As detailed herein, at least one embodiment of the invention includes performing selected replication to protect VMs against failures via replication while maximizing the total values of the running services with constraints of resource capacity. Consider the following example (wherein d=2, by way merely of example):

For VMj that is not replicated:
$Pr\{X_j(t)=1 \text{ and } \Sigma_{i=1}^{m} x_{i,j}=1\}=e^{-\lambda_j t}$, and
$Pr\{X_j(t)=0\}=1-e^{-\lambda_j t}$,
where t is the time from when $VM_j$ starts.

For VMj that is replicated:
$Pr\{X_j(t)=1 \text{ and } \Sigma_{i=1}^{m} x_{i,j}=2\}=e^{-2\lambda_j t}$,
$Pr\{X_j(t)=1 \text{ and } \Sigma_{i+1}^{m} x_{i,j}=1\}=2e^{-\lambda_j t}-2e^{-2\lambda_j t}$, and
$Pr\{X_j(t)=0\}=1-2e^{-\lambda_j t}+e^{-2\lambda_j t}$,
where t is the time from when $VM_j$ starts.

Additionally, the sum of service values provided by the cloud at time t is obtained by adding up values of live SPSs (for cases wherein all VMs are equally important in $SNS_k$):
$S=\Sigma_{k=1}^{l}(u_k \Pi_{j \in p_k} X_j)$, where $P_k=\{j|y_{k,j}=1, 1 \leq j \leq n\}$.

A goal includes maximizing E(S) by selecting $x_{i,j}$ subject to:

$$\begin{cases} y_{k,j} \in [0,1], \text{ for all } 1 \leq j \leq n, 1 \leq k \leq l \\ x_{i,j} \in [0,1], \text{ for all } 1 \leq j \leq n, 1 \leq i \leq m \\ \sum_{j=1}^{n} r_j \cdot x_{i,j} \leq R_i, \text{ for } 1 \leq i \leq m \\ \sum_{j=1}^{m} x_{i,j} \leq d, \text{ for } 1 \leq i \leq n \end{cases}$$

The formulation of S above can be extended for cases when VMs in an SNS are not equally important, for example, by adding up values of all live execution paths (elements of the SPS). As such, the $u_k$ value is distributed to these execution paths. Also, at least one embodiment of the invention includes replication factor $\alpha$, which is explained as follows:
$\Sigma_j r_j \leq \alpha \cdot \Sigma_{i=1}^{m} R_i$, for all $j(1 \leq j \leq n)$ such that $\Sigma_{i=1}^{m} x_{i,j}=2,3,\ldots$ or d.

In connection with selected replication, at least one embodiment of the invention includes consideration of the effective value of a VM (v) that includes the sum of weighted values of those SPSs whose corresponding SNSs include this VM:

$$v_j = \sum_{k \in M_j} u_k y_{k,j},$$

where $M_j = \{k | y_{k,j} > 0\}, 1 \leq j \leq n$.

Such an embodiment can include the use of a Heuristic algorithm to select those VMs with maximum expected loss of effective values due to failures, wherein:
Probability of $X_j=0$ is denoted as $p_j$; and
Expected loss for $VM_j$'s failure is $p_j * v_j$.

As such, at least one embodiment of the invention includes periodically carrying out the following algorithm to select a set of VMs to replicate:

1. Q={the VMs not planned to be replicated by this algorithm; initially empty}; and C={the candidate VMs to be replicated}; (O(n)) (C is initially the n VMs).

2. Sort all of the VMs in C according to their (p*v/r) ratio in the increasing order (O(n log n)); (The p*v/r measures the expected loss for each VM's failure per resource unit.)

3. Determine if the VMs in C can be replicated on the spare resources (VMs in Q excluded) within resource capacity (O(nm)) (wherein m denotes number of hypervisors):
   Determine if the total resources for replication are no more than the spare resources;
   If yes, apply a first-fit or best-fit multidimensional knapsack problem (MKP) heuristic algorithm during the test; and
   If successful, proceed to step 5; otherwise, go to step 4;

4. Q=Q+{the VM with the smallest (p*v/r) value that is not in Q}; go to step 3;
The complexity of steps 3 and 4: (O(n2m)); and 5. C-Q is the final set of VMs selected for replication. (O(n)). The algorithm complexity is (O(n2m)).

As also detailed herein, an aspect of the invention additionally includes restarting failed VMs while maximizing the total values of the running service paths with constraints of resource capacity. Accordingly, at least one embodiment of the invention can include carrying out the following steps:

Determine $\max(\Sigma_{k=1}^{l}(u_k \cdot \Pi_{j \in P_k}(\Sigma_{i=1}^{m} x_{i,j})))$, where $P_k=\{j|y_{k,j}=1, 1 \leq j \leq n\}$ (for cases wherein all VMs are equally important $SNS_k$). As such, at least one embodiment of the invention includes selecting $x_{i,j}$ properly subject to:

$$\begin{cases} y_{k,j} \in [0, 1], \text{ for all } 1 \leq j \leq n, 1 \leq k \leq l \\ x_{i,j} \in [0, 1], \text{ for all } 1 \leq j \leq n, 1 \leq i \leq m \\ \sum_{j=1}^{n} r_j \cdot x_{i,j} \leq R_i, \text{ for } 1 \leq i \leq m \\ \sum_{j=1}^{m} x_{i,j} \leq d, \text{ for } 1 \leq i \leq n \end{cases}$$

The above formulation can be extended, for example, for cases wherein VMs in an SNS are not equally important to one another (similar to the way in selected replication).

Additionally, at least one embodiment of the invention can include selecting a tranche of VMs to provision and/or restart via the following algorithm. Multiple tranches can be selected by running this algorithm multiple times.
1. P={the SNSs not planned to be restarted by this algorithm; initially empty}; C={the failed SNSs to be restarted}; (O(k)) (k=|C|);
2. Sort all of the SNSs in C according to their u/sum(r) ratio in the increasing order (O(k log k)) (wherein sum(r) is the resource usage of all VMs in this SNS); (u is the general representation of each $u_k$, as defined herein, and similarly, r is the general representation of each $r_j$, as also defined herein.)
3. Test if the VMs in (C-P)'s SNSs can be provisioned and/or restarted on the hypervisors within the capacity of computation resource (or other resource) for provisioning VMs (O(jm)) (wherein j denotes the number of failed VMs and m denotes the number of hypervisors):
    A first-fit or best-fit MKP heuristic algorithm can be applied during the test; and
    If successful, proceed to step 5; otherwise, go to step 4;
4. P=P+{the SNS in C that has smallest u/sum(r) value and is not in P}; go to step 3 (wherein the complexity of steps 3 and 4 is (O(kjm))); and
5. (C-P)'s VMs are the final set of VMs selected for restart; (O(j)) (wherein the algorithm complexity is (O(k log k+kjm))).

Figure 4:
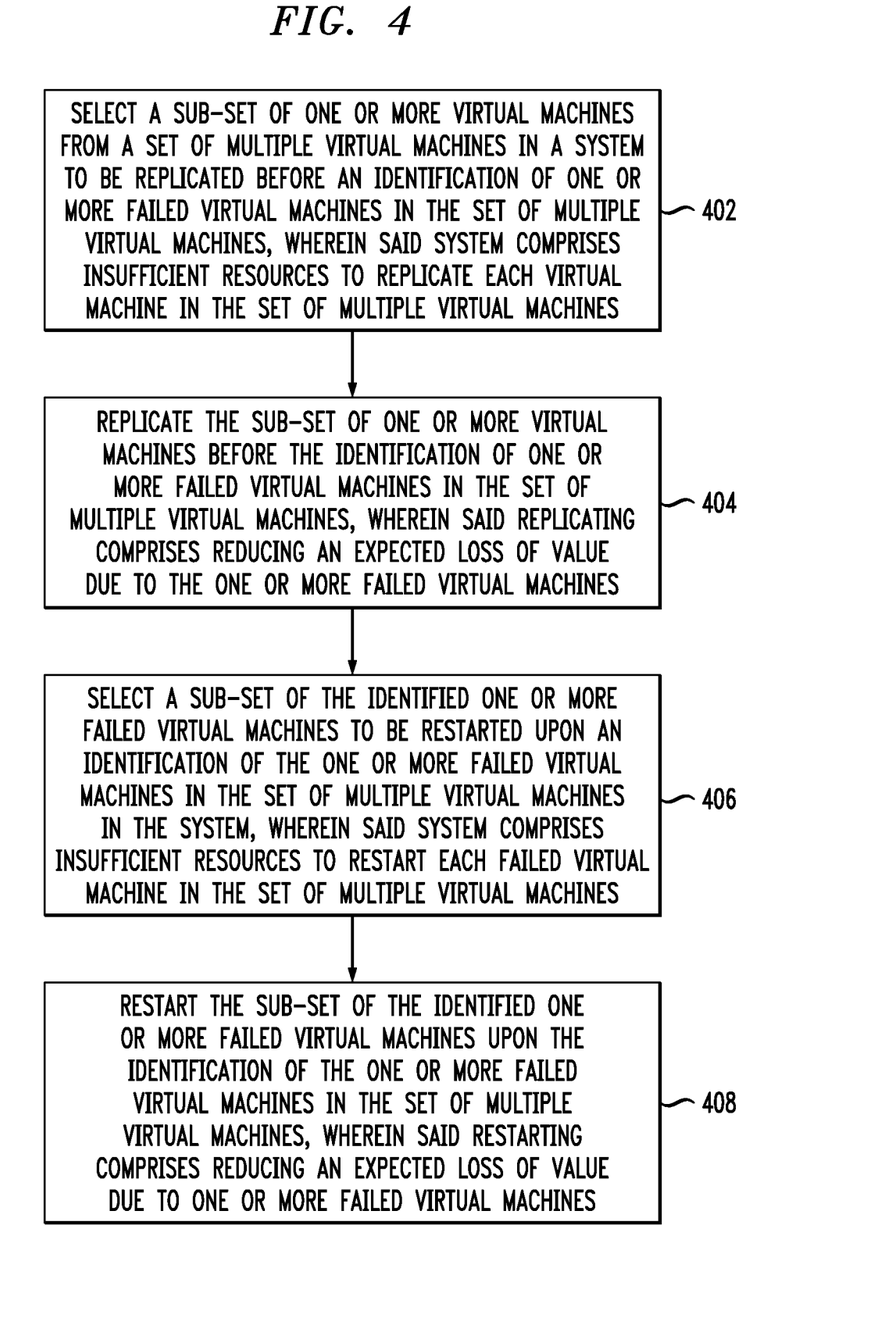
FIG. 4 is a flow diagram illustrating techniques according to an embodiment of the invention.

FIG. 4 is a flow diagram illustrating techniques according to an embodiment of the invention. Step 402 includes selecting a sub-set of one or more virtual machines from a set of multiple virtual machines in a system to be replicated before an identification of one or more failed virtual machines in the set of multiple virtual machines, wherein said system comprises insufficient resources to replicate each virtual machine in the set of multiple virtual machines. Selecting can include identifying one or more failure-prone virtual machines.

In at least one embodiment of the invention, the failed virtual machine can be a member of a group of multiple machines that each contribute to the provision of a service. Additionally, each virtual machine in the group of virtual machines can be weighted equally with respect to priority within the group for the provision of the service, or each virtual machine in the group can be weighted differently with respect to priority within the group for the provision of the service.

Step 404 includes replicating the sub-set of one or more virtual machines before the identification of one or more failed virtual machines in the set of multiple virtual machines, wherein said replicating comprises reducing an expected loss of value due to the one or more failed virtual machines.

Step 406 includes selecting a sub-set of the identified one or more failed virtual machines to be restarted upon an identification of the one or more failed virtual machines in the set of multiple virtual machines in the system, wherein said system comprises insufficient resources to restart each failed virtual machine in the set of multiple virtual machines.

Step 408 includes restarting the sub-set of the identified one or more failed virtual machines upon the identification of the one or more failed virtual machines in the set of multiple virtual machines, wherein said restarting comprises reducing an expected loss of value due to one or more failed virtual machines.

The techniques depicted in FIG. 4 can also include restarting the one or more failed virtual machines. Restarting the failed virtual machine(s) can include restarting the failed virtual machine(s) within at least one constraint such as, for example, computation capacity and/or network bandwidth capacity for replication.

The techniques depicted in FIG. 4 can additionally include allocating a (configurable) pre-determined amount of resources for replication prior to an identified failure. Also, at least one embodiment of the invention includes replicating the selected sub-set of one or more virtual machines into the pre-determined amount of resources prior to an identified failure of the at least one selected virtual machine. The selected virtual machine(s) can be a failure-prone virtual machine, identified as a failure-prone virtual machine based on enterprise priority information and/or failure behavior of multiple virtual machines.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 5:
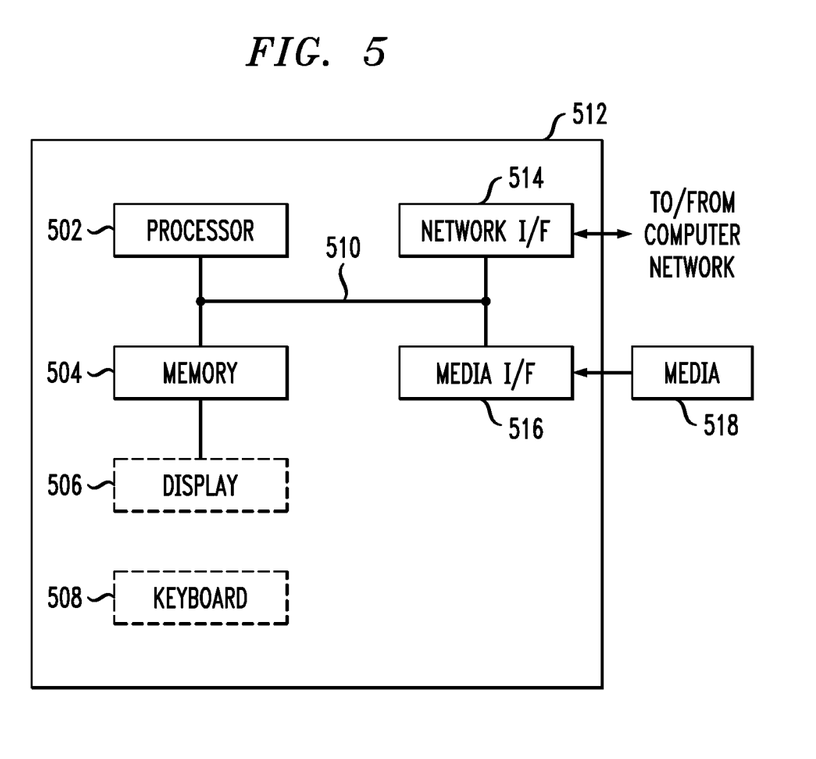
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using values associated with service node sets to control a VM resource assignment decision.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

selecting a sub-set of one or more virtual machines from a set of multiple virtual machines in a system to be replicated before an identification of one or more failed virtual machines in the set of multiple virtual machines, wherein said system comprises insufficient resources to replicate each virtual machine in the set of multiple virtual machines;

replicating the sub-set of one or more virtual machines before the identification of one or more failed virtual machines in the set of multiple virtual machines, wherein said replicating comprises reducing an expected loss of value due to one or more failed virtual machines;

selecting a sub-set of the identified one or more failed virtual machines to be restarted upon an identification of the one or more failed virtual machines in the set of multiple virtual machines in the system, wherein said system comprises insufficient resources to restart each failed virtual machine in the set of multiple virtual machines; and restarting the sub-set of the identified one or more failed virtual machines upon the identification of the one or more failed virtual machines in the set of multiple virtual machines, wherein said restarting comprises reducing an expected loss of value due to one or more failed virtual machines;

wherein said selecting steps, said replicating step and said restarting step are carried out by at least one computing device.

2. The method of claim 1, wherein said restarting comprises restarting the sub-set of the identified one or more failed virtual machines within at least one constraint.

3. The method of claim 2, wherein said at least one constraint comprises computation capacity.

4. The method of claim 2, wherein said at least one constraint comprises network bandwidth capacity for replication.

5. The method of claim 1, comprising:
allocating a pre-determined amount of resources for said replicating the sub-set of one or more virtual machines prior to an identified failure of one or more virtual machines.

6. The method of claim 5, comprising:
replicating the sub-set of one or more virtual machines into the pre-determined amount of resources.

7. The method of claim 5, wherein said pre-determined amount of resources is configurable.

8. The method of claim 1, wherein said selecting comprises identifying one or more failure-prone virtual machines.

9. The method of claim 8, comprising:
identifying the one or more failure-prone virtual machines based on enterprise priority information and/or failure behavior of multiple virtual machines.

10. The method of claim 1, wherein each of said one or more failed virtual machines is a member of a group of multiple machines that each contribute to the provision of a service.

11. The method of claim 10, wherein each virtual machine in the group of virtual machines is weighted equally with respect to priority within the group for the provision of the service.

12. The method of claim 10, wherein each virtual machine in the group of virtual machines is weighted differently with respect to priority within the group for the provision of the service.

13. An article of manufacture comprising a non-transitory computer readable storage medium having computer readable instructions tangibly embodied thereon which, when implemented, cause a computer to carry out a plurality of method steps comprising:
selecting a sub-set of one or more virtual machines from a set of multiple virtual machines in a system to be replicated before an identification of one or more failed virtual machines in the set of multiple virtual machines, wherein said system comprises insufficient resources to replicate each virtual machine in the set of multiple virtual machines;
replicating the sub-set of one or more virtual machines before the identification of one or more failed virtual machines in the set of multiple virtual machines, wherein said replicating comprises reducing an expected loss of value due to the one or more failed virtual machines;
selecting a sub-set of the identified one or more failed virtual machines to be restarted upon an identification of the one or more failed virtual machines in the set of multiple virtual machines in the system, wherein said system comprises insufficient resources to restart each failed virtual machine in the set of multiple virtual machines; and
restarting the sub-set of the identified one or more failed virtual machines upon the identification of the one or more failed virtual machines in the set of multiple virtual machines, wherein said restarting comprises reducing an expected loss of value due to one or more failed virtual machines.

14. The article of manufacture of claim 13, wherein the method steps comprise:
allocating a pre-determined amount of resources for said replicating the sub-set of one or more virtual machines prior to an identified failure of one or more virtual machines.

15. The article of manufacture of claim 14, wherein the method steps comprise:
replicating the sub-set of one or more virtual machines into the pre-determined amount of resources.

16. The article of manufacture of claim 13, wherein said selecting comprises identifying one or more failure-prone virtual machines.

17. The article of manufacture of claim 13, wherein said restarting the failed virtual machine comprises restarting the failed virtual machine within at least one constraint.

18. A system comprising:
a memory; and
at least one processor coupled to the memory and configured for:
selecting a sub-set of one or more virtual machines from a set of multiple virtual machines in a system to be replicated before an identification of one or more failed virtual machines in the set of multiple virtual machines, wherein said system comprises insufficient resources to replicate each virtual machine in the set of multiple virtual machines;
replicating the sub-set of one or more virtual machines before the identification of one or more failed virtual machines in the set of multiple virtual machines, wherein said replicating comprises reducing an expected loss of value due to the one or more failed virtual machines;
selecting a sub-set of the identified one or more failed virtual machines to be restarted upon an identification of the one or more failed virtual machines in the set of multiple virtual machines in the system, wherein said system comprises insufficient resources to restart each failed virtual machine in the set of multiple virtual machines; and
restarting the sub-set of the identified one or more failed virtual machines upon the identification of the one or more failed virtual machines in the set of multiple virtual machines, wherein said restarting comprises reducing an expected loss of value due to one or more failed virtual machines.

19. The system of claim 18, wherein the at least one processor is further configured for:
allocating a pre-determined amount of resources for said replicating the sub-set of one or more virtual machines prior to an identified failure of one or more virtual machines.

20. The system of claim 18, wherein the at least one processor is further configured for:
replicating the sub-set of one or more virtual machines into the pre-determined amount of resources.

* * * * *